US005788873A

United States Patent [19]
Warsaw

[11] Patent Number: 5,788,873
[45] Date of Patent: Aug. 4, 1998

[54] SNOW MOLD

[76] Inventor: Nick E. Warsaw, 1702 Derbyshire SE., Grand Rapids, Mich. 49508

[21] Appl. No.: 674,541

[22] Filed: Jul. 2, 1996

[51] Int. Cl.[6] ................................................ B28B 7/16
[52] U.S. Cl. .................................. 249/170; 425/DIG. 57
[58] Field of Search ..................... 425/DIG. 57; 249/154, 249/159, 170, 171, 55, 126, 163; 264/74, 77

[56] References Cited

U.S. PATENT DOCUMENTS

| | | | |
|---|---|---|---|
| 928,162 | 8/1909 | Stewart | 249/170 |
| 1,906,882 | 5/1933 | Perret | 249/171 |
| 2,651,871 | 9/1953 | Lynden | 41/26 |
| 2,652,592 | 9/1953 | Williams | 249/160 |
| 2,920,350 | 1/1960 | Hosch | 264/77 |
| 3,054,279 | 10/1962 | Rossi | 162/20 |
| 3,079,644 | 3/1963 | Molitor et al. | 264/74 |
| 3,667,990 | 6/1972 | Rogers | 117/38 |
| 3,685,942 | 8/1972 | Shaffer | 425/276 |
| 3,841,019 | 10/1974 | Lorenzo | 46/16 |
| 3,848,846 | 11/1974 | Edner | 249/66 |
| 4,164,341 | 8/1979 | McComb | 249/126 |
| 4,725,036 | 2/1988 | Brandon et al. | 249/164 |
| 4,798,162 | 1/1989 | Nelson | 118/26 |
| 5,165,966 | 11/1992 | Adams | 427/256 |

*Primary Examiner*—Jay H. Woo
*Assistant Examiner*—Iurie Schwartz
*Attorney, Agent, or Firm*—Robert J. Sayfie

[57] ABSTRACT

A snow mold including a pair of mold halves interconnected along a common edge by a hinge. Each mold half includes a mold cavity which cooperate to mold an object when closed together. Each mold cavity further includes a stencil pattern extending through the walls of the mold to receive an externally applied coloring agent to highlight features of the molded object.

3 Claims, 2 Drawing Sheets

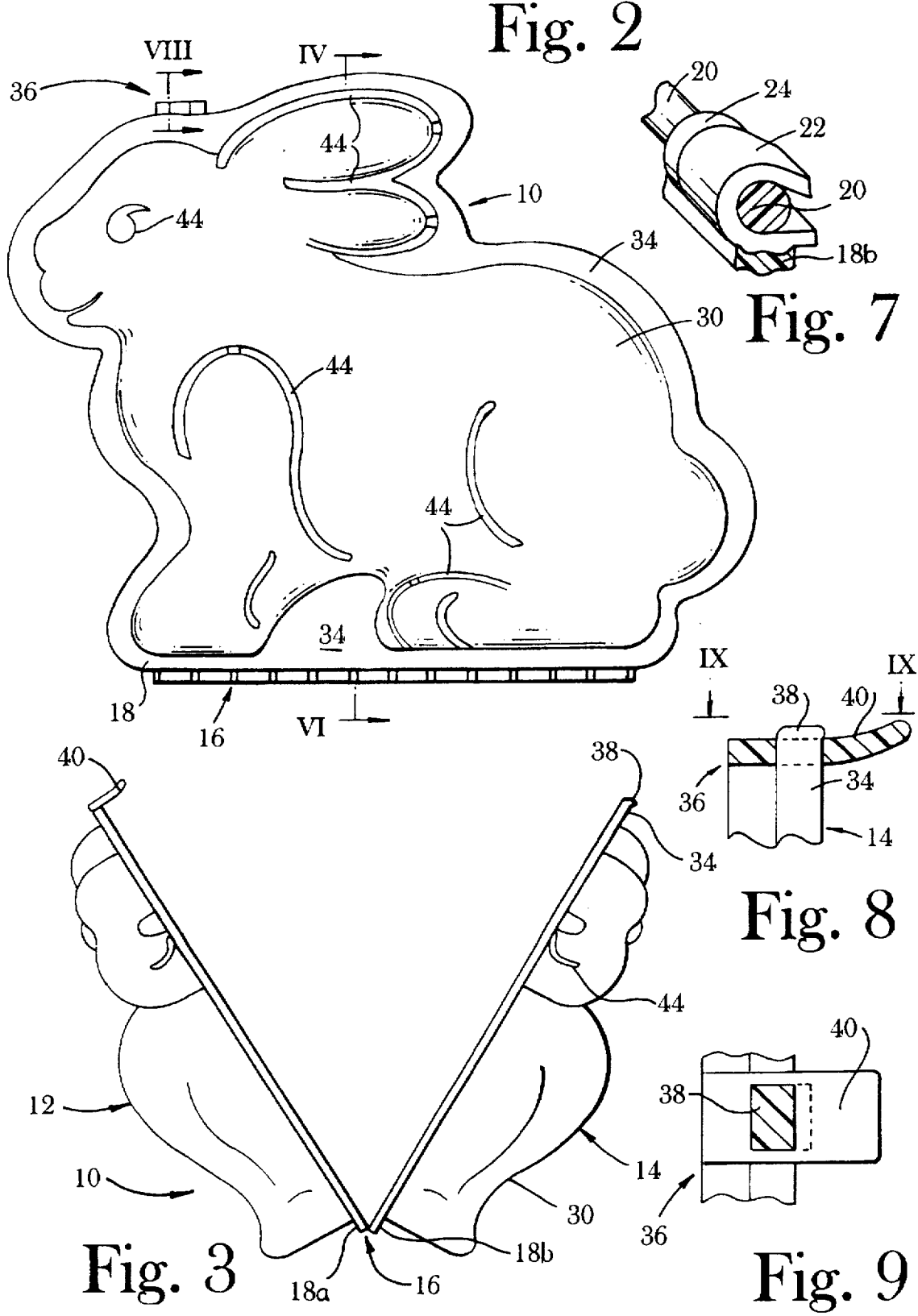

SNOW MOLD

FIELD OF THE INVENTION

The present invention relates to an apparatus for molding objects and particularly to an apparatus for molding objects from snow having highlighted features.

BACKGROUND OF THE INVENTION

Throughout the winter months in frigid climes when snow is on the ground, children and adults create snowmen and other objects or sculptures from the snow. Such sculptures are often formed by rolling the snow into balls and combining the various size balls to create the figure. Kitchen, yard or other utensils are used to sculpt the snow statue to the final shape. Because of the motor skills of some individuals, building snow sculptures or statutes is extremely frustrating.

U.S. Pat. No. 3,059,279 entitled Multisectional Interlocked Snow Mold discloses three two-piece mold sections each open at the top and the bottom so that snow may be packed therein. Once the sphere is packed, the two mold halves comprising each section are unbolted and unhooked so that the two halves completely separate.

U.S. Pat. No. 4,164,341 discloses a snow man mold consisting of two parts assembled prior to filling with snow, held together along opposing peripheral flanges through fastening pins. A large opening formed in each section of one mold half so that an individual may fill the mold with snow and pack it within the mold. When the snow reaches the height of the opening, the user fills the mold from the next higher opening. When full, the fastening pins are withdrawn and the two mold halves completely separate from each other.

U.S. Pat. No. 4,725,036 discloses a snow mold device consisting of two opposing mold sections held together by a mold frame. The frame is designed to slidably receive the mold sections to compress the snow between the mold sections. The mold frame is latter split apart to separate the tow mold sections.

All of the snow molds described above have at least two mold sections which separate completely from each other. All have rather complex fastening arrangements or fasteners to keep the mold sections together when being filled with snow, or to compress the mold sections together. A disadvantage associated with such an arrangement is that the mold sections could become separated and lost. A further disadvantage associated with each of the prior molds is they do not provide a way for highlighting features of the molded object while the snow is still in the mold. None of the prior molds provide a template as pattern along certain features of the molded object so that a coloring agent may be applied through the mold halves to outline that particular feature.

SUMMARY OF THE INVENTION

The present invention is a mold to be filled with snow to form a figure or design. The molded figure or design is highlighted by a coloring agent applied from the exterior of the mold to enhance certain features of the figure or design.

The invention significantly improves on the prior snow mold by providing a stencil pattern formed on each mold half along the mold cavity to provide access for a coloring agent to the molded object. The two mold halves are also interconnected by a hinge so that the mold may be opened and closed and the two mold halves stay together.

In another form of the invention, the mold halves may be kept the closed position by one or more latching mechanisms located about the edge of the mold. Each mold half is preferably formed from a polymeric material to define one half of the molded figure or design. The sizes and shapes of the mold are limited only by handling and manufacturing limitations.

The advantages provided by the invention include the ease in molding the snow. A person of limited motor skills can easily carry the snow mold, fill it with snow and close the halves together to compress the snow into the selected shape. The hinge assures that the two mold halves will stay together. The stencil pattern extending through the sides of each mold half allow the individual to highlight certain features of the molded object so that the molded design will stand out while on display.

Another advantage of the invention is that its use is not limited to snow. The mold may also be used to create objects from other materials which can be conditioned to stay within the mold cavity, such as sand, clay, concrete, etc.

BRIEF DESCRIPTION OF THE DRAWING FIGURES

The above advantages, purposes and other features of the invention will become apparent from the following detailed description taken in conjunction with the appended drawing figures, wherein:

FIG. 2 is a side elevational view of the invention shown in FIG. 1;

FIG. 3 is a front elevational view of the invention shown in open FIG. 1;

FIG. 6–7 are perspective fragmentary sectional views of the assembled hinge shown in FIG. 5;

FIG. 8 is a fragmentary sectional view of the latch assembly taken along line VIII—VIII shown in FIG. 1; and FIG. 9 is a fragmentary plan view of the latch assembly taken along IX—IX shown in FIG. 8.

DETAILED DESCRIPTION OF THE PREFERRED EMBODIMENT

Figure 1:
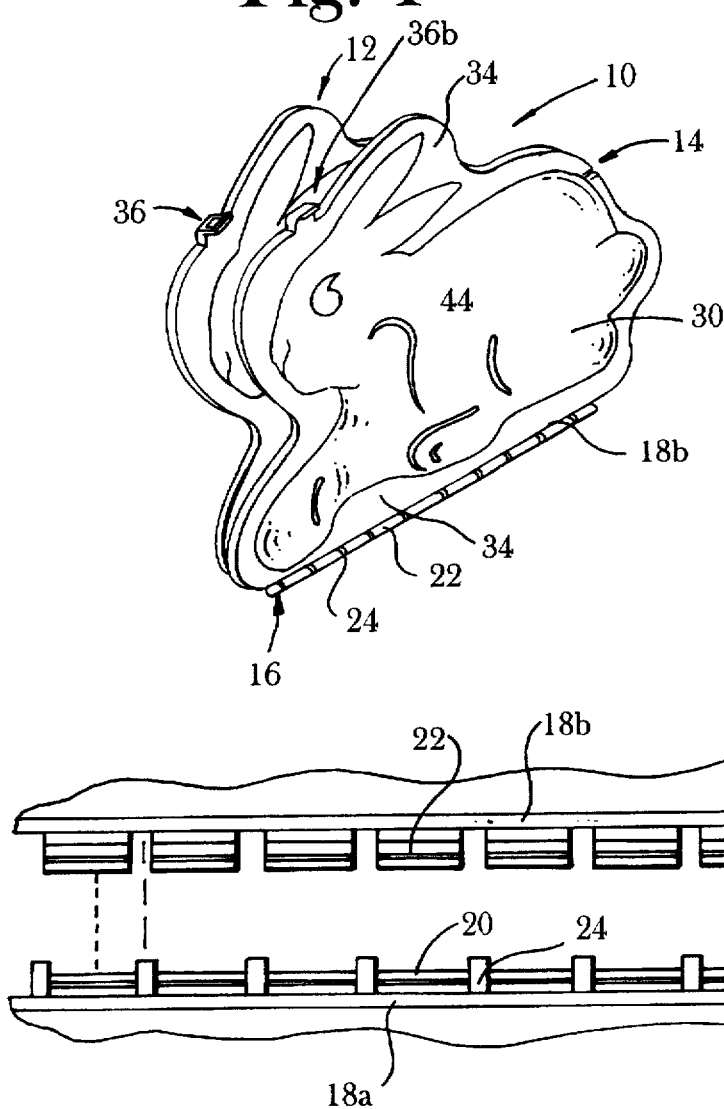
FIG. 1 is a perspective view of a snow mold embodying the invention.

Referring now to FIGS. 1–9, the snow mold 10 of this invention includes a pair of mold halves 12 through 14 which cooperate to mold a desired figure or design. Mold halves 12, 14 are preferably made from a polymeric material such as polyurethane, polyethylene or other thermoplastic which is workable in temperatures ranging from subfreezing to tropical. The preferred polymeric material would be flexible throughout the entire temperature range. Less versatile polymeric materials may be employed where they do not constitute a moving part of the invention. In a preferred embodiment, both mold halves 12 m 14 are molded as a single piece and separated by a living hinge 16 (FIG. 3). It is contemplated that, in the alternative, mold halves 12, 14 may be formed individually and joined by a hinge. In one form (FIG. 5 ), edge 18*a* of mold half 12 is molded to define a hinge pin 20 while edge 18*b* of mold half 14 is molded to form the hinge bearing or hook 22. Hinge pin 20 is supported by and attached to edge 18*a* at spaced intervals 24 while hinge bearing 22 is interrupted at corresponding intervals to accommodate the hinge pin supports 24. Hinge bearing or hook 22 is U-shaped to allow ingress and egress of hinge pin 20 so that the two mold halves 12, 14 may be snapped together. In yet another alternative, a hinge plate made from metal or plastic can be attached to each edge 18a, 18b of the mold halves 12, 14. If a metallic hinge assembly is used, it is preferred that it be made from galvanized or stainless steel or other material which will not rust.

Figure 4:
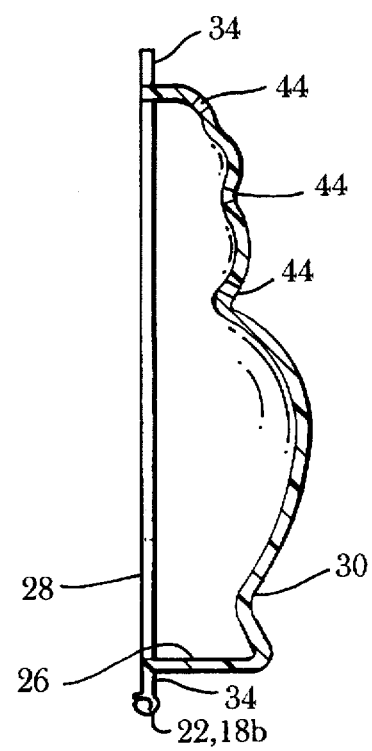
FIG. 4 is a front sectional view of one half of the invention taken along line IV—IV shown in FIG. 2.
Figure 5:
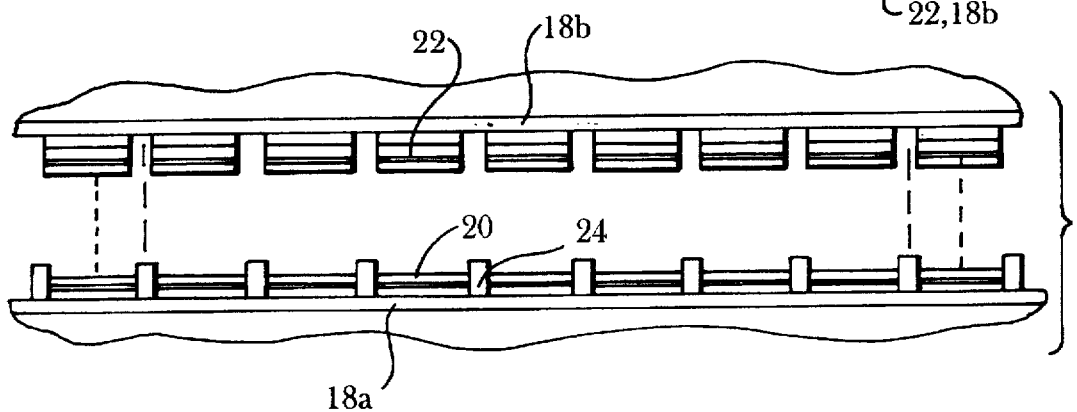
FIG. 5 is an exploded view of one embodiment of a hinge of this invention.
Figure 6:
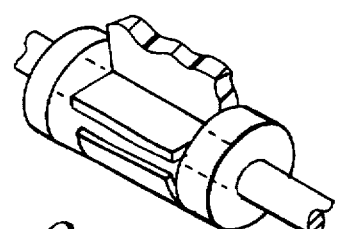

Referring to FIGS. 3–4, each mold half 12, 14 is preferably made using a conventional injection molding process. The polymeric material is heated and injected into a mold cavity defined by opposing plates. A space between the opposing plates defines the mold cavity which has a shape corresponding to one or more mold halves. The molten polymeric material is injected into the mold and allowed to harden or set before being removed from the mold.

Each mold half 12, 14 includes a mold cavity or depression 26 formed in one side 28 and a positive expression 30 formed on the opposite side of each mold half. A flat border or perimeter 34 of polymeric material extends from at least one portion of the mold cavity 26 to provide for the hinge 16, although it is preferred that border 34 extend around the entire mold cavity 26 in each mold half 12, 14.

Border 34 also provides one or more locations for a latch such as 36 to keep mold 10 closed. Border 34 also provides an area for the user to press mold halves 12, 14 together while also strengthening or bolstering the perimeter or edges of each mold cavity 26.

In a preferred embodiment shown in FIGS. 8 and 9, latch 36 includes a plug or detent 38 extending from or defined along border 34 of mold half 14 which is adapted to be received by a catch 40 extending generally perpendicular from surface 28 of mold half 12. Although catch 40 retains detent 38, it is contemplated that other latching devices may be used as well. Such other latches may include clips, cams or snaps, for example.

Referring again to FIG. 2, each mold half 12, 14 contains a stencil pattern 44 which extends through each mold half in the areas containing or defining mold cavity 26. Stencil pattern 44 preferably highlights certain features of the molded object. For example, if mold 10 is in the shape of an animal, stencil pattern 44 may highlight facial or body features of the animal. Instances where mold 10 is a geometric design, stencil pattern 44 may highlight a boundary between one or more shapes, or create a pattern design on the molded object such as parallel lines, dots, cross-hatching or other designs. Stencil pattern 44 may be formed in each mold half 12, 14 either before, during or after each mold 12, 14 has been formed.

In operation, the user opens mold 10 by releasing latch 36 and swinging mold halves 12, 14, apart about hinge 16.

Unpacked snow is deposited into mold cavity 26 in each mold half 12, 14 and packed slightly therein. Additional snow is added and piled in a mound which extends above inner surface 28 of each mold half 12, 14. The two mold halves are closed and clamped together such that the mound of snow extending from each cavity 26 is compacted between each mold half 12, 14. With the mold closed, the user may then apply a coloring agent, such as a vegetable-based, non-toxic, washable dye, through the openings provided by stencil pattern 44. The coloring agent may be mixed with a gelling agent and applied to stencil pattern 44 in a spray or stream. When the coloring agent mixture contacts the snow within mold cavity 26, the gelling agent sets up and is prevented from dissipating as the snow partially melts. Details of the coloring agent mixture are disclosed in U.S. Pat. No. 5,165,966 incorporated herein by reference. With the coloring agent added to the compressed snow with mold 10, the mold is opened by releasing one or more latches 36, and mold halves 12, 14 are parted about a hinge 16. The molded figure or object may then be removed and displayed.

It is contemplated that mold 10 may be made in a variety of sizes, depending upon the scale of the figure to be molded, the limitations of the molding equipment, and the handling ability of the user. For example, mold ranging in any one dimension of several feet to as small as several inches are easily produced. Molds larger than several feet in any one dimension may become too heavy for the user to handle when filled with compacted snow.

The snow mold can further be used to mold animal objects, animal figures from snow.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

The embodiments of the invention in which an exclusive property or privilege is claimed are defined as follows:

1. A snow mold assembly for making three-dimensional animal objects from snow, comprising in combination:

a) a pair of mold halves formed from a polymeric material, each having a mold cavity cooperating to define a three-dimensional animal figure, each mold cavity in said mold half define a particular feature of said three-dimensional animal figure;

b) a hinge interconnecting said pair mold halves together along a common edge to permit said mold halves to pivot about said hinge between closed and open positions;

c) a latching mechanism defined along an edge of each mold half opposite said hinge for keeping the mold in the closed position, said latching mechanism including a catch extending from said edge of a first mold half and a plug extending from said edge of second mold half to be received by said catch; and d) said pair of mold halves through which apertures are located, whereby a coloring agent can be applied through said apertures of said three-dimensional animal figure, said aperture located in the specific area to identify the location of the eyes, legs, ears, and tail of the animal figure.

2. A snow mold assembly for making three-dimensional animal figures, comprising:

a) a pair of mold halves molded from a plastic material, each generally a mirror image of the other and cooperating to define a mold cavity, each mold half having at least one hole extending therethrough along a feature of the animal figure defined by said pair of mold halves;

b) a hinge interconnecting said pair of mold halves permitting articulation of said pair of mold halves about said hinge between an open and closed position;

c) a catch extending from an edge of one of said pair of mold halves configured to detachably close said pair of mold halves together in said closed positions; and d) said pair of mold halves through which apertures are located, whereby a coloring agent can be applied through said apertures of said three-dimensional animal figure, said aperture located in the specific area to identify the location of the eyes, legs, ears, and tail of the animal figure.

3. A snow mold assembly comprising:
a) first and second mold halves, each having a mold cavity cooperating together to define a three-dimensional animal figure therebetween from snow, each mold half made from a molded polymeric material to provide one half of said animal figure to be molded;
b) each mold cavity having an opening;
c) said pair of mold halves through which apertures are located, whereby a coloring agent can be applied through said apertures of said three-dimensional animal figure, said aperture located in the specific area to identify the location of the eyes, legs, ears, and tail of the animal figure;
d) a hinge interconnecting said first and second mold halves and allowing said mold halves to pivot with respect to each other about said hinge; and
e) a catch extending from an edge of said first mold half, and a plug extending from an edge of said second mold half for detachably engaging said catch and retaining said first and second mold halves in a closed position.

* * * * *